Feb. 18, 1964   C. C. CHITTOCK   3,121,488
ENSILAGE CUTTER AND LOADER
Filed Oct. 9, 1961   2 Sheets-Sheet 1
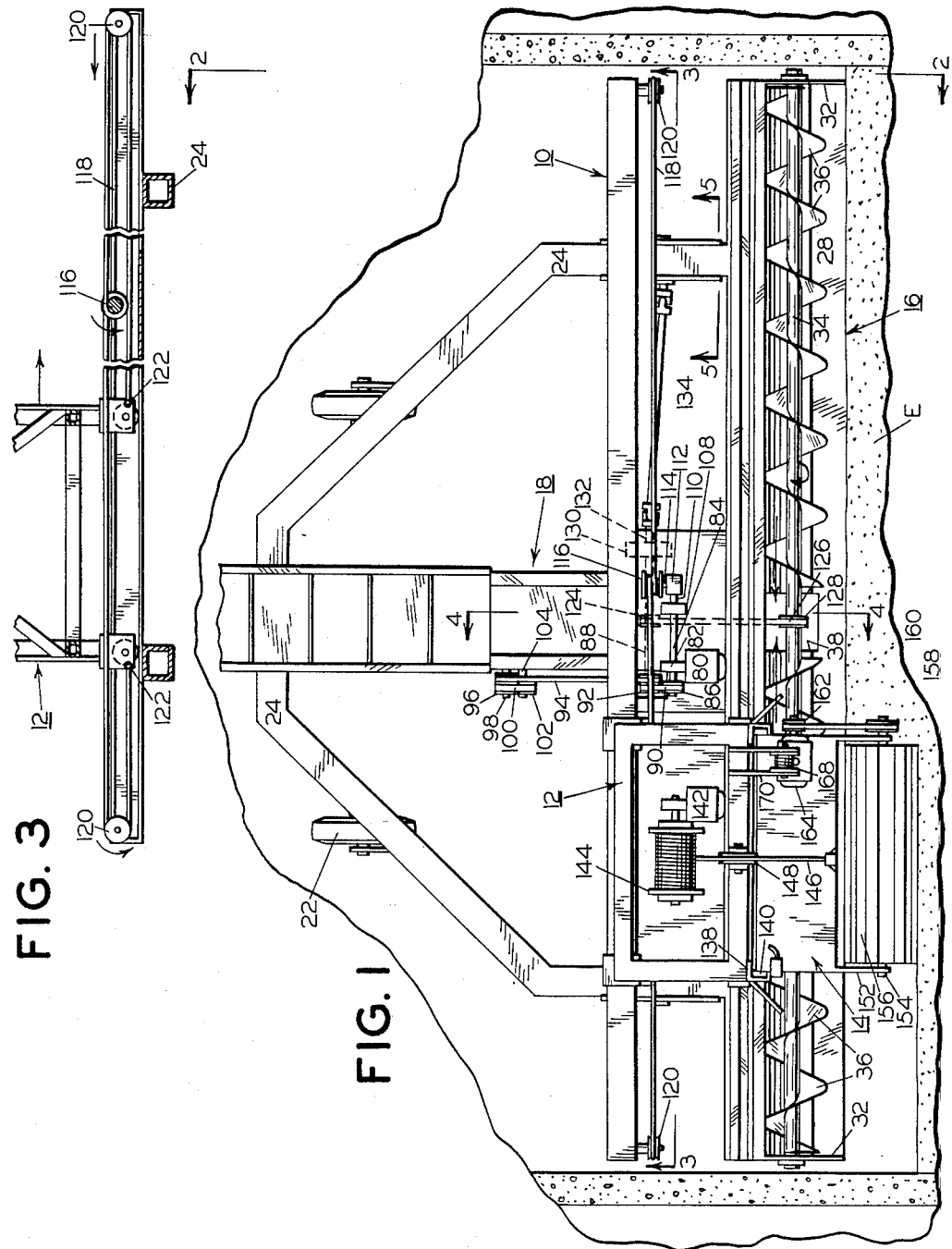
INVENTOR.
CHARLES C. CHITTOCK
BY Eugene M. Eckelman
ATTORNEY

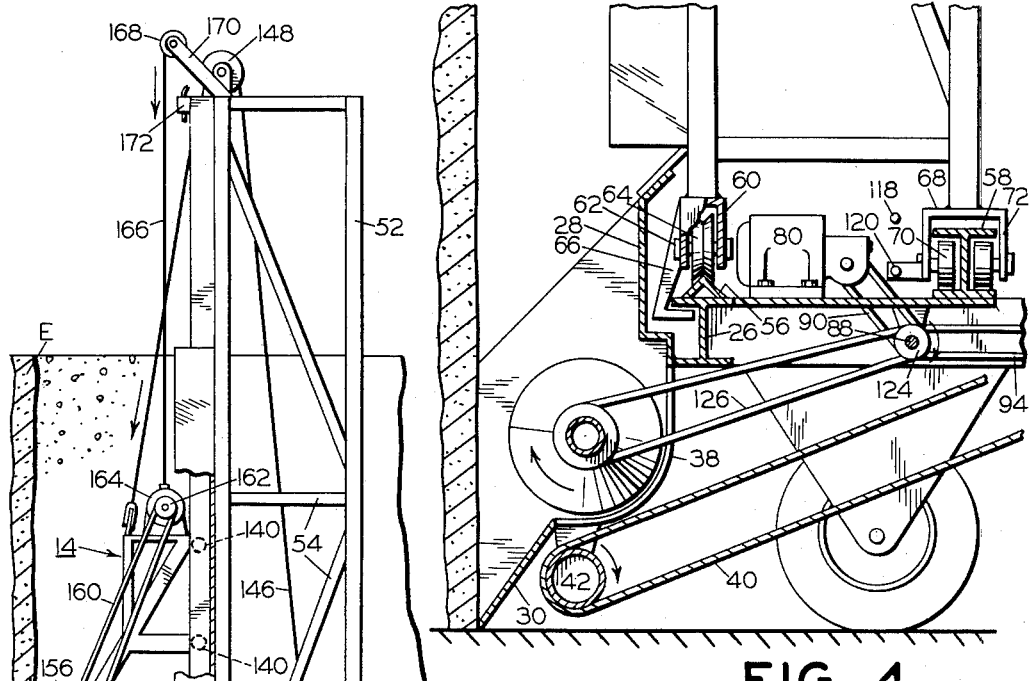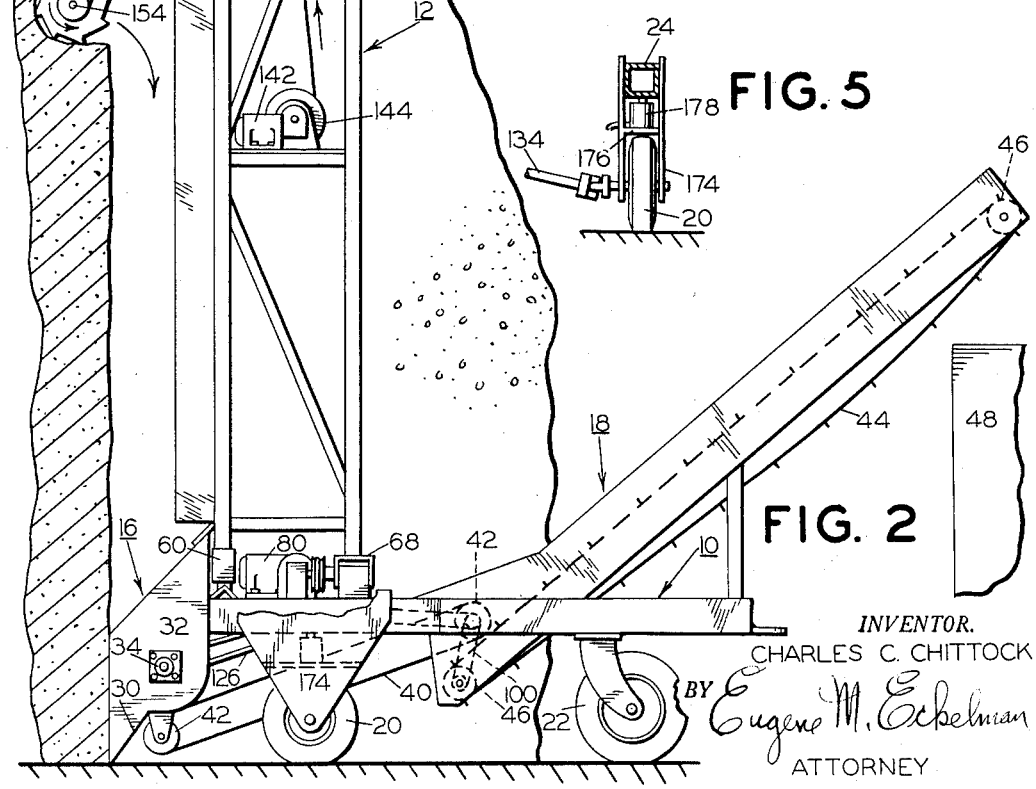

United States Patent Office 3,121,488
Patented Feb. 18, 1964

3,121,488
ENSILAGE CUTTER AND LOADER
Charles C. Chittock, Grants Pass, Oreg.
(189 Vashti Way, Medford, Oreg.)
Filed Oct. 9, 1961, Ser. No. 143,823
5 Claims. (Cl. 198—9)

This invention relates to improvements in ensilage cutters and loaders.

It is now common practice to provide open earth trenches for the storage of ensilage. These trenches eliminate the use of expensive upright siloes but raise the problem of removal of the ensilage therefrom as it is needed. Such material has heretofore been cut and loosened by hand and loaded onto conveying vehicles which of course is not satisfactory due to the time consumed for accomplishing such removal. Apparatuses for removing such material have been proposed such apparatus have not proved satisfactory due to the fact that they cannot work the entire trench without frequent lateral shifting of the vehicle whereby considerable waste time is consumed. Furthermore, some of such apparatuses employ other farm machinery as power means therefor which of course means tying up such piece of equipment for other uses.

It is accordingly an important object of the present invention to provide an improved ensilage cutter and loader which overcomes the disadvantages enumerated above.

More particularly it is an object to provide an ensilage cutter and loader which is adapted efficiently to work the full width of a trench without lateral shifting of the apparatus.

Another object is to provide an ensilage cutter and loader comprising a complete assembly of working parts wherein the device is self-transportable and capable of accomplishing all the functions in the removal and loading of the ensilage.

Briefly stated the device comprises a wheeled frame carrying an upright cutter head tower which is adjustable laterally on the wheeled frame. The upright tower slidably supports a vertically movable frame carrying a cutter head. Also carried on the wheel frame is a screw conveyor comprising a pair of spiral conveyors having a reverse pitches whereby to move cut ensilage centrally of the machine onto a belt conveyor which in turn moves the material onto a flight conveyor for loading into a truck. In use the apparatus is moved into the ensilage trench, the cutting head frame first being raised to the top of the tower and the tower first being moved to one side of the wheeled frame. The cutter head is then put in operation and lowered by gravity to cut a swath in the ensilage. When the cutter head has cut a vertical swath to the bottom of the ensilage it is again raised to the top of the tower and the tower moved laterally for the next downward swath of the cutter head. When the cutter head has completely removed a lateral layer the entire apparatus is driven downwardly for the next layer cut.

The invention will be better understood and additional objects and advantages will become apparent from the following description taken in connection with the accompanying drawings which illustrate a preferred form of the device. It is to be understood however that the invention may take other forms and that all such modifications and variations within the scope of the appended claims which will appear to persons skilled in the art are included in the invention.

In the drawings:

FIGURE 1 is a top plan view of the present ensilage cutter and loader;

FIGURE 2 is a side elevational view thereof showing the cutter head in the operation of cutting a swath in the ensilage;

FIGURE 3 is a sectional view taken on the line 3—3 of FIGURE 1 and showing drive means for laterally shifting the tower;

FIGURE 4 is a sectional view taken on the line 4—4 of FIGURE 1; and

FIGURE 5 is a sectional view taken on the line 5—5 of FIGURE 1 showing a front wheel assembly.

The ensilage loader of the present invention comprises in general a bottom frame 10, a vertical cutter head tower 12, a cutter head frame 14, a pickup head 16, and conveyor means 18. It is adapted for use particularly with an ensilage charge E contained in an earth surface trench.

The frame 10 is supported on a pair of front wheels 20 and rear wheels 22, the rear wheels being steerable. Frame 10 has longitudinal structural members 24 which may form a frame configuration as seen in plan in FIGURE 1, and transverse reinforcing of frame 10 is provided by suitable structural members such as I-beams 26 or the like, one of which is seen in FIGURE 4.

Pickup head 16 comprises a full length trough 28 integrally secured to the front of frame 10 as by welding. Trough 28 has a downwardly extending lip portion 30 the lower edge of which is adapted to be disposed adjacent the ground surface. Trough 28 has end plates 32 in which is journaled a shaft 34. Shaft 34 carries a pair of spiral conveyors 36, these conveyors 36 having their spirals pitched in opposite directions in order to carry ensilage which may be deposited into the trough 28 toward the center. The trough has a central opening 38 for discharging the ensilage.

Disposed below the opening of the trough is a belt conveyor 40 operating over end rolls 42, and this belt conveyor deposits the material onto a second or flight conveyor 44 operating over end rolls 46. Conveyor 44 extends upwardly to a point whereby to deposit the material into a vehicle 48, FIGURE 2.

The cutter head tower 12 comprises upright structural leg members 52 and suitable reinforcing and connecting members 54. This tower is of a height greater than the depth of the ensilage stack whereby the cutter head frame 14 may operate the full depth of the trench.

Tower 12 is mounted on the bottom frame 10 for transverse adjustable movement and a preferred manner of such movable mounting is best seen in FIGURE 4. For this purpose the frame 10 supports a pair of transversely disposed tracks 56 and 58, the track 56 comprising an inverted V-shaped structure and the track 58 comprising an I-beam structure. Secured transversely to the reel tower at the bottom of front leg members 52 are inverted channel members 60 having shafts 62 for journaled engagement with wheels 64, the wheels 64 having a V-shaped surface for engagement with the track 56. Carried on the channel members 60 are hooks 66 a portion of which is disposed under the upper section of I-beam frame member 26 whereby rearward tilting of the reel is prevented.

Second channel members 68 are provided on the bottom of rear leg members 52 of the tower 12 and pairs of wheels 70 are supported in these channels. Such wheels engage guideways 72 formed on opposite sides of I-beam 58 secured to the frame 10.

By the tower mounting structure described it is apparent that said tower is freely movable transversely of the frame and that its upright position is assured by means of the hooks 66 and by the guided relation of wheels 70 in the I-beam 58.

Power drive means are provided for propelling the vehicle 10, for driving conveyors 40 and 44, and for moving the cutter head tower transversely. In a preferred arrangement, a common drive motor 80 is provided which operates through gear reducing means 82 to drive a shaft 84 which projects from both sides of the gear reducer 82. One end of shaft 84 carries a pulley 86 which serves to drive a lower shaft 88 by means of a belt 90 engageable with a multiple groove pulley 92 on the latter shaft. Also engageable with pulley 92 is a second belt 94 engaged with a multiple pulley 96 on a shaft 98 projecting from upper end roll 42 of conveyor 40. Also engageable with pulley 96 is a belt 100 leading to a pulley 102 on a shaft 104 projecting from bottom end roll 46 of the second conveyor 44. By this drive arrangement it is apparent that upon operation of motor 80 both conveyors 42 and 44 are set in motion.

The other end of shaft 84 opposite from pulley 86 is connected to one element of a clutch 108, the other element of such clutch being connected to a shaft portion 110 leading into a gear box 112 having an output shaft 114. Shaft 114 is connected to a winch drum 116 around which is reeved a cable 118 engaging end pulleys 120 best seen in FIGURE 3. One end of cable 118 is connected to one end of the tower 12 as by means of a lug 122, FIGURE 4, on the support channel 68 and the other end of the cable is similarly connected to the opposite end of the tower. Thus upon operation of motor 80 and also upon engagement of the clutch elements 108 as well as selective forward or reverse condition of gear box 112 the tower is moved laterally of the frame 10 in the desired direction.

A pulley 124 is keyed to the shaft 88 and is engaged by a belt 126 also engaging a pulley 128 on shaft 34. Shaft 88 extends beyond the pulley 124 and leads into a gear box 130 having an output shaft 132 connected to a universal drive shaft 134 in turn connected to the axle of one of the wheels 20. Gear box 130 has suitable forward, reverse, and neutral positions and it is thus apparent that by suitable control thereof, not shown, the drive shaft 134 may be operated in either direction or be inoperative.

Cutter head frame 14 has vertical movement on the tower 12 and for this purpose tower has channel tracks 138, FIGURE 1, engageable by rollers 140 on the cutter head frame 14. Upward movement of the cutter head frame is accomplished by a drive motor 142 supported on a platform intermediate the upper and lower ends of the tower and operating a winch 144 for a cable 146. Cable 146 is reeved over a pulley 148 mounted on the top of the tower and is suitably connected to the cutter head frame 14. Thus, it is apparent that upward movement of the cutter head frame is accomplished by motor 142 and its lowering cutting operation is accomplished by the free gravitation weight thereof.

The frame 14 has a pair of forwardly and downwardly extending arms 152 rotatably supporting a shaft 154 on which is keyed a cutter head 156. One end of the shaft 154 is extended and has a pulley 158 keyed thereto and engaged by a belt 160 also engageable with a pulley 162 operated by a drive motor 164. Electrical lead wires 166, FIGURE 1, for the drive motor 164 is reeved on a spring loaded reel 168 supported on arms 170 projecting from the upper end of the tower. By such structure the lead wires 166 are uncoiled from the reel 168 as the cutter head frame moves downwardly on the tower, and since such reel is spring loaded it provides the necessary extension of the lead wire and yet maintains the latter in slack free condition. Upward retracting movement of cutter head frame 14 is arrested by means of a limit switch 172 secured to the upper end of the tower. This switch is in the path of frame 14 and is adapted to open the circuit to the drive motor 142 at the extreme upper position of the frame.

It is desirable that the entire frame be raised relative to the front wheels so that the pickup head is spaced above the ground when the device is moved, and for this purpose, FIGURES 2 and 5, each of the front wheel assemblies comprises a yoke having a pair of upright plates 174 integrally connected by a plate 176 intermediate their ends. Seated on the plate 176 is a fluid cylinder 178 the piston of which projects upwardly and supports the front portion of structural members 24. These latter members are slidably disposed between plates 174 and it will thus be apparent that by power extension of the pistons of cylinders 178 in both front wheel assemblies the front end of the loader is raised and it is then capable of movement to the site or capable of longitudinal adjustable movement in the pit. Drive means and control means for the fluid cylinder may assume conventional structure and are not shown.

Operation

In the operation of the present device, it is moved into the earth trench to a position wherein the pickup head 16 is in engagement with the forward wall of the ensilage stack E, the frame first being raised slightly by means of fluid cylinders 178 to permit such movement. The cutter head frame 14 is also first moved to the upper end of the tower by actuation of drive motor 142 before reaching operative position of the loader in the pit. The frame is lowered by exhausting fluid cylinders 178. Drive motor 80 is actuated to rotate shafts 84, 88, to put the conveyor shaft 34 and the conveyor 40, 44 into operation, the elements 34, 40, and 44 operating continually as long as drive motor 80 is in operation. In this phase of operation it is assumed that clutches 108 and 130 are disengaged and thus the drive winch 116 for lateral adjustment of the tower 12 and the shaft 134 for driving a wheel 20 are inoperative.

When it is desired to adjust the tower 12 laterally on the frame so that a new cutting swath may be accomplished clutch 108 is engaged, gear box 112 first being put in forward or reverse condition, depending upon the direction of movement desired for the tower. Thus the tower is driven to the desired position by the cable 118 operating on the winch drum 116.

Thereupon cutter head drive motor 164 is actuated and the cutter head frame 14 lowered whereby head 156 cuts a swath downwardly in the face of the ensilage stack, the downward movement of the cutter head being accomplished by gravity. Material cut by the cutter head 156 falls into the trough 28 whereupon the spiral conveyors 36 on the shaft 34 convey the material inwardly into central opening 38. The cut material falls onto conveyors 40 which in turn deposits the material onto conveyor 44 for loading into a vehicle.

To cut a swath in the ensilage adjacent the first cut the cutter head frame is moved to the top of the tower by actuation of drive motor 142 and then clutch 108 engaged to drive the winch 116 and thus move the tower to a new position.

Thus by repeated shifting of the tower an entire layer is cut from the face of the ensilage without repositioning of the vehicle itself.

Upon removal of a complete layer from the ensilage stack the vehicle is then moved ahead by shifting elements of gear box 130 to the desired position.

Thus by means of the present invention, the present ensilage cutter and loader is adapted to work efficiently in a trench and remove the ensilage without lateral repositioning of the vehicle. It is driven under its own power for advancing movement in the trench and of course can be transported to the desired location by the same drive means. Although particular controls for the various drive elements are not illustrated it is to be understood that such controls may assume any form or arrangement according to conventional practice.

It is to be understood that the form of my invention herein shown and described is to be taken as a preferred example of the same and that various changes in the shape, size and arrangement of parts may be resorted to without departing from the spirit of my invention or the scope of the subjoined claims.

Having thus described my invention, I claim:

1. Apparatus for cutting material from a vertical stack of ensilage material comprising a supporting frame, an upright tower laterally movable on said supporting frame, a cutter head frame vertically movable on said tower, drive means on said tower for moving the cutter head frame upwardly, and a power driven cutter head on said cutter head frame for cutting a swath of ensilage material upon downward gravity movement of said cutter head frame.

2. The apparatus of claim 1 including a trough on the supporting frame vertically aligned with the cutter head frame for receiving cut material loosened by said cutter head, and conveyor means for discharging said material from said trough.

3. The apparatus of claim 1 including power drive means for laterally moving said tower on said supporting frame, a trough on the supporting frame vertically aligned with the cutter head frame for receiving cut material loosened by said cutter head, and conveyor means for discharging said material from said trough.

4. Apparatus for cutting material from a vertical stack of ensilage material comprising a supporting frame, laterally disposed tracks on said frame, a vertically disposed wheeled tower supported on said tracks for lateral adjustable movement, power means for driving said tower in said lateral adjustable movement, means on said tower associated with said supporting frame for maintaining said tower in upright position, a cutter head frame vertically movable on said tower, power drive means for moving the cutter head frame upwardly on said tower, a cutter head on said cutter head frame for cutting a swath of ensilage material upon downward gravity movement of said cutter head frame, power drive means for operating said cutter head, a pickup head mounted on said supporting frame in vertical alignment with said cutter head frame for receiving cut material loosened by said cutter head, and screw conveyor means associated with said pickup head for discharging said material from said pickup head.

5. Apparatus for cutting material from a vertical stack of ensilage material comprising a supporting frame of a width substantially as wide as said stack of material, laterally disposed tracks on said frame, a vertically disposed wheeled tower supported on said tracks for lateral adjustable movement and being of a height greater than said stack of material, a cutter head frame vertically movable on said tower, power drive means for moving the cutter head frame upwardly on said tower, a power driven cutter head on said cutter head frame for cutting vertical swaths of ensilage material upon downward gravity movement of said cutter head frame, power drive means for moving said tower laterally and incrementally on said supporting frame for establishing adjacent cutting swaths of said cutter head across the face of the ensilage stack, a pickup head mounted on said supporting frame in vertical alignment with said cutter head frame for receiving cut material loosened by said cutter head, and screw conveyor means associated with said pickup head for discharging said material from said pickup head.

References Cited in the file of this patent

UNITED STATES PATENTS

| | | |
|---|---|---|
| 1,638,507 | O'Toole | Aug. 9, 1927 |
| 2,696,375 | Huff | Dec. 7, 1954 |
| 2,762,141 | LeTourneau | Sept. 11, 1956 |